United States Patent
Duan et al.

(10) Patent No.: US 9,532,234 B2
(45) Date of Patent: Dec. 27, 2016

(54) MULTIMODE BASE STATION CONTROL METHOD AND BASE STATION

(71) Applicant: Huawei Technologies Co., Ltd., Shenzhen, Guangdong (CN)

(72) Inventors: Xiaoming Duan, Shenzhen (CN); Jiang Zhu, Shanghai (CN); Yingfeng Fei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/981,030

(22) Filed: Dec. 28, 2015

(65) Prior Publication Data

US 2016/0112881 A1    Apr. 21, 2016

Related U.S. Application Data

(63) Continuation of application No. PCT/CN2013/078262, filed on Jun. 28, 2013.

(51) Int. Cl.
| | |
|---|---|
| *H04W 4/00* | (2009.01) |
| *H04W 16/18* | (2009.01) |
| *H04L 12/26* | (2006.01) |
| *H04B 7/06* | (2006.01) |
| *H04B 7/08* | (2006.01) |
| *H04W 52/02* | (2009.01) |

(52) U.S. Cl.
CPC ........... *H04W 16/18* (2013.01); *H04B 7/0689* (2013.01); *H04B 7/0871* (2013.01); *H04L 43/16* (2013.01); *H04W 52/0206* (2013.01)

(58) Field of Classification Search
CPC ......... H04L 43/16; H04L 12/26; H04W 16/18; H04W 88/10; H04W 52/0206; H04W 16/28; H04W 72/046; H04B 7/0871; H04B 7/0689; H04B 7/0825; H04B 7/0831; H04B 7/0874; H01Q 21/28; H01Q 1/243
USPC ............. 455/422.1, 562.1; 370/252; 340/941
See application file for complete search history.

(56) References Cited

U.S. PATENT DOCUMENTS

| | | | |
|---|---|---|---|
| 4,425,567 | A | 1/1984 | Tresselt |
| 4,584,581 | A | 4/1986 | Teshirogi |

(Continued)

FOREIGN PATENT DOCUMENTS

| | | |
|---|---|---|
| CN | 1622490 A | 6/2005 |
| CN | 1622491 A | 6/2005 |

(Continued)

*Primary Examiner* — Mahendra Patel

(57) ABSTRACT

Embodiments of the present invention relate to the field of communications technologies, and disclose a multimode base station control method and a base station, which can implement real-time control over transmit power of a base station, thereby improving network energy efficiency. The method includes: switching on, by a base station, a passive antenna to provide service coverage in a first standard for a user; detecting, by the base station, an average traffic volume of a cell in a current state; and when the average traffic volume of the cell in the current state exceeds a preset first threshold, enabling capacity coverage that is in a second standard and is to be provided for the user, and switching an active antenna of the base station to an on state according to the capacity coverage that is in the second standard and provided for the user.

9 Claims, 6 Drawing Sheets

(56) References Cited

U.S. PATENT DOCUMENTS

| | | | |
|---|---|---|---|
| 6,104,930 A * | 8/2000 | Ward | H04W 16/28 455/450 |
| 8,154,469 B2 | 4/2012 | McKinley et al. | |
| 8,805,379 B2 * | 8/2014 | Tiwari | H04W 36/26 370/331 |
| 9,413,395 B2 * | 8/2016 | Love | H04B 1/0064 |
| 2004/0192222 A1 * | 9/2004 | Vaisanen | H04B 1/44 455/78 |
| 2005/0093744 A1 | 5/2005 | Davis et al. | |
| 2005/0271016 A1 | 12/2005 | Kim et al. | |
| 2007/0126630 A1 | 6/2007 | Coppi et al. | |
| 2008/0200195 A1 * | 8/2008 | Abe | H04W 16/14 455/501 |
| 2009/0015475 A1 * | 1/2009 | Fujishiro | H01Q 1/246 342/372 |
| 2009/0196371 A1 * | 8/2009 | Yamamoto | H04B 7/0808 375/267 |
| 2011/0250926 A1 * | 10/2011 | Wietfeldt | H01Q 1/243 455/525 |
| 2011/0306312 A1 | 12/2011 | Hamalainen | |
| 2012/0044824 A1 | 2/2012 | Osterling et al. | |
| 2012/0165063 A1 | 6/2012 | Scalia et al. | |
| 2014/0073340 A1 * | 3/2014 | Nilsson | H04W 16/28 455/452.1 |

FOREIGN PATENT DOCUMENTS

| | | | | |
|---|---|---|---|---|
| CN | 1867157 A | 11/2006 | | |
| CN | 101257335 A | 9/2008 | | |
| CN | 101499835 A | 8/2009 | | |
| CN | 102110883 A | 6/2011 | | |
| CN | 102668408 A | 9/2012 | | |
| CN | 102685767 A | 9/2012 | | |
| EP | 0 510 955 A1 | 10/1992 | | |
| EP | 2 006 956 A2 | 12/2008 | | |
| KR | WO 2012118269 A3 * | 10/2012 | | H04L 5/0053 |
| WO | WO 2005/050783 A1 | 6/2005 | | |
| WO | WO 2012/146313 A1 | 11/2012 | | |

* cited by examiner

MULTIMODE BASE STATION CONTROL METHOD AND BASE STATION

CROSS-REFERENCE TO RELATED APPLICATIONS

This application is a continuation of International Application No. PCT/CN2013/078262, filed on Jun. 28, 2013, which is hereby incorporated by reference in its entirety.

TECHNICAL FIELD

Embodiments of the present invention relate to communications technologies, and in particular, to a multimode base station control method and a base station.

BACKGROUND

Currently, mobile communication of the second generation mobile communications technology (The second generation, 2G), the third generation mobile communications technology (The 3rd Generation, 3G), and the fourth generation mobile communications technology (The 4th generation, 4G) develops jointly, and many operators operate networks in multiple modes at the same time, for example, operate a Global System for Mobile communications (Global System of Mobile communication, GSM)/Universal Mobile Telecommunications System (Universal Mobile Telecommunications System, UMTS) dual-mode network, that is, a 2G/3G network. As this type of network emerges, growing demands for mobile services can be satisfied on one hand, and sharing of a multi-standard site can be implemented on the other hand, which facilitates smooth evolution of a 2G network to a 3G network. With accelerated development of 4G mobile broadband, in the future, a 2G/4G or 3G/4G single radio access network (Single Radio Access Network, SRAN) network will also emerge, and on the basis of constantly satisfying rapidly growing demands for mobile broadband services, smooth evolution to a 4G network will be implemented.

However, in an existing dual-mode or multimode network, a base station cannot flexibly control transmit power according to a need of a user in a coverage cell, which results in a low overall energy efficiency of a network in which the base station is located.

SUMMARY

In view of this, embodiments of the present invention provide a multimode base station control method and a base station, which can implement real-time control over transmit power of a base station according to a user need by adjusting a work state of an active antenna of the base station, thereby improving network energy efficiency.

According to a first aspect, a multimode base station control method is provided, including:

switching on, by a base station, a passive antenna to provide service coverage in a first standard for a user;

detecting, by the base station, an average traffic volume of a cell in a current state; and when the average traffic volume of the cell in the current state is less than a preset first threshold, disabling capacity coverage that is in a second standard and provided for the user, and switching an active antenna of the base station to an off state.

In a first possible implementation manner, with reference to the first aspect, the method includes:

when the average traffic volume of the cell in the current state is less than the preset first threshold, disabling the capacity coverage that is in the second standard and provided for the user, and switching the active antenna of the base station to an off state.

In a second possible implementation manner, with reference to the first aspect, the when the average traffic volume of the cell in the current state exceeds a preset first threshold, enabling capacity coverage that is in a second standard and to be provided for the user, and switching an active antenna of the base station to an on state includes:

when the average traffic volume of the cell in the current state exceeds the preset first threshold, enabling the capacity coverage that is in the second standard and to be provided for the user, and switching the active antenna of the base station to a beam projection state according to the capacity coverage that is in the second standard and provided for the user.

In a third possible implementation manner, with reference to the second possible implementation manner, when the active antenna is in the beam projection state, the method further includes:

detecting whether the average traffic volume of the cell in the current state is less than the first threshold, and when the user average traffic volume of the cell is less than the first threshold, disabling the capacity coverage that is in the second standard and provided for the user, and switching the active antenna of the base station to an off state;

when the average traffic volume of the cell is greater than the first threshold, determining whether the average traffic volume of the cell is greater than a third threshold, and when the average traffic volume of the cell is less than the third threshold, maintaining enabling of the capacity coverage that is in the second standard and provided for the user, and maintaining the active antenna of the base station in the beam projection state; and when the user average traffic volume of the cell is greater than the third threshold, maintaining enabling of the capacity coverage that is in the second standard and provided for the user, and switching the active antenna of the base station to a split state of the active antenna, where an average traffic volume corresponding to the third threshold exceeds an average traffic volume corresponding to the first threshold.

In a fourth possible implementation manner, with reference to the third possible implementation manner, when the active antenna is in the split state of the active antenna, the method further includes:

detecting whether the average traffic volume of the cell in the current state is less than the second threshold, and when the average traffic volume of the cell in the current state is less than the preset second threshold, maintaining enabling of the capacity coverage that is in the second standard and provided for the user, and switching the active antenna of the base station to the beam projection state; and when the user average traffic volume of the cell in the current state exceeds the preset second threshold, maintaining enabling of the capacity coverage that is in the second standard and provided for the user, and maintaining the active antenna of the base station in the current split state of the active antenna;

where a traffic volume corresponding to the second threshold is greater than a traffic volume corresponding to the first threshold, and the traffic volume corresponding to the second threshold is less than a traffic volume corresponding to the third threshold.

In a fifth possible implementation manner, with reference to the first aspect or any one of the possible implementation manners of the first aspect, in the on state of the active antenna, the method further includes:

detecting a user traffic distribution state in the cell in the current state;

when the average traffic volume of the cell in the current state or the user traffic distribution state in the cell changes, updating a user traffic distribution map;

adjusting the capacity coverage in the second standard according to the updated user traffic map; and setting a transmission parameter of the active antenna according to the adjusted capacity coverage in the second standard, where the transmission parameter includes at least one of the following: width, a direction, and power of a beam.

In a sixth possible implementation manner, with reference to the first aspect or any one of the possible implementation manners of the first aspect, the first standard is UMTS, and the second standard is LTE; or the first standard is GSM, and the second standard is LTE; or the first standard is GSM, and the second standard is UMTS; or the first standard is GSM, and the second standard is TD-SCDMA; or the first standard is TD-SCDMA, and the second standard is TD-LTE.

According to a second aspect, a base station is provided, including:

an antenna control unit, configured to switch on a passive antenna to provide service coverage in a first standard for a user;

a detection unit, configured to detect an average traffic volume of a cell in a current state; and a coverage control unit, configured to: when the detection unit detects that the average traffic volume of the cell in the current state exceeds a preset first threshold, enable capacity coverage that is in a second standard and is to be provided for the user;

where the antenna control unit is further configured to: when the detection unit detects that the average traffic volume of the cell in the current state exceeds the preset first threshold, switch an active antenna of the base station to an on state.

In a first possible implementation manner, with reference to the second aspect, including:

the coverage control unit is further configured to: when the detection unit detects that the average traffic volume of the cell in the current state is less than the preset first threshold, disable the capacity coverage that is in the second standard and provided for the user; and the antenna control unit is further configured to: when the detection unit detects that the average traffic volume of the cell in the current state is less than the preset first threshold, switch the active antenna of the base station to an off state.

In a second possible implementation manner, with reference to the second aspect, the antenna control unit is specifically configured to: when the detection unit detects that the average traffic volume of the cell in the current state exceeds the preset first threshold, switch the active antenna of the base station to a beam projection state.

In a third possible implementation manner, with reference to the second possible implementation manner, when the active antenna is in the beam projection state, the detection unit is further configured to detect whether the average traffic volume of the cell in the current state is less than the first threshold;

the coverage control unit is further configured to: when the detection unit detects that the user average traffic volume of the cell is less than the first threshold, disable the capacity coverage that is in the second standard and provided for the user;

the antenna control unit is further configured to: when the detection unit detects that the user average traffic volume of the cell is less than the first threshold, switch the active antenna of the base station to an off state;

the detection unit is further configured to: when the average traffic volume of the cell is greater than the first threshold, determine whether the average traffic volume of the cell is greater than a third threshold;

the coverage control unit is further configured to: when the detection unit detects that the average traffic volume of the cell is less than the third threshold, maintain enabling of the capacity coverage that is in the second standard and provided for the user;

the antenna control unit is further configured to: when the detection unit detects that the average traffic volume of the cell is less than the third threshold, maintain the active antenna of the base station in the beam projection state;

the coverage control unit is further configured to: when the detection unit detects that the user average traffic volume of the cell is greater than the third threshold, maintain enabling of the capacity coverage that is in the second standard and provided for the user; and the antenna control unit is further configured to: when the detection unit detects that the user average traffic volume of the cell is greater than the third threshold, switch the active antenna of the base station to a split state of the active antenna, where an average traffic volume corresponding to the third threshold exceeds an average traffic volume corresponding to the first threshold.

In a fourth possible implementation manner, with reference to the third possible implementation manner, when the active antenna is in the split state of the active antenna, the detection unit is further configured to detect whether the average traffic volume of the cell in the current state is less than the second threshold;

the coverage control unit is further configured to: when the detection unit detects that the average traffic volume of the cell in the current state is less than the preset second threshold, maintain enabling of the capacity coverage that is in the second standard and provided for the user;

the antenna control unit is further configured to: when the detection unit detects that the average traffic volume of the cell in the current state is less than the preset second threshold, switch the active antenna of the base station to the beam projection state;

the coverage control unit is further configured to: when the detection unit detects that the user average traffic volume of the cell in the current state exceeds the preset second threshold, maintain enabling of the capacity coverage that is in the second standard and provided for the user; and the antenna control unit is further configured to: when the detection unit detects that the user average traffic volume of the cell in the current state exceeds the preset second threshold, maintain the active antenna of the base station in the current split state of the active antenna;

where a traffic volume corresponding to the second threshold is greater than a traffic volume corresponding to the first threshold, and the traffic volume corresponding to the second threshold is less than a traffic volume corresponding to the third threshold.

In a fifth possible implementation manner, with reference to the second aspect or any one of the possible implementation manners of the second aspect, in the on state of the active antenna, the base station further includes: a traffic control unit, where:

the detection unit is further configured to detect a user traffic distribution state in the cell in the current state;

the traffic control unit is configured to: when the detection unit detects that the average traffic volume of the cell in the current state or the user traffic distribution state in the cell changes, update a user traffic distribution map;

the coverage control unit is configured to adjust the capacity coverage in the second standard according to the user traffic map updated by the traffic control unit; and the antenna control unit is configured to set a transmission parameter of the active antenna according to the capacity coverage in the second standard adjusted by the coverage control unit, where the transmission parameter includes at least one of the following: width, a direction, and power of a beam.

According to a third aspect, a base station is provided, including: at least one processor, memory, receiver, transmitter, and data bus, where the data bus is configured to implement connection and communication between the processor, the memory, the receiver, and the transmitter, the memory is configured to store program code and data that are executed by the processor, the receiver receives service data by using an antenna, and the transmitter transmits service data by using the antenna;

where the processor is configured to switch on a passive antenna to provide service coverage in a first standard for a user; detect an average traffic volume of a cell in a current state; and when the average traffic volume of the cell in the current state exceeds a preset first threshold, enable capacity coverage that is in a second standard and is to be provided for the user, and switch an active antenna of the base station to an on state.

In a first possible implementation manner, with reference to the first aspect, the server is further configured to: when the average traffic volume of the cell in the current state is less than the preset first threshold, disable the capacity coverage that is in the second standard and provided for the user, and switch the active antenna of the base station to an off state.

In a second possible implementation manner, with reference to the third aspect, the processor is specifically configured to: when the average traffic volume of the cell in the current state exceeds the preset first threshold, enable the capacity coverage that is in the second standard and is to be provided for the user, and switch the active antenna of the base station to a beam projection state.

In a third possible implementation manner, with reference to the second possible implementation manner, when the active antenna is in the beam projection state, the processor is configured to detect whether the average traffic volume of the cell in the current state is less than the first threshold, and when the user average traffic volume of the cell is less than the first threshold, disable the capacity coverage that is in the second standard and provided for the user, and switch the active antenna of the base station to an off state;

when the average traffic volume of the cell is greater than the first threshold, determine whether the average traffic volume of the cell is greater than a third threshold, and when the average traffic volume of the cell is less than the third threshold, maintain enabling of the capacity coverage that is in the second standard and provided for the user, and maintain the active antenna of the base station in the beam projection state; and when the user average traffic volume of the cell is greater than the third threshold, maintain enabling of the capacity coverage that is in the second standard and provided for the user, and switch the active antenna of the base station to a split state of the active antenna, where an average traffic volume corresponding to the third threshold exceeds an average traffic volume corresponding to the first threshold.

In a fourth possible implementation manner, with reference to the third possible implementation manner, when the active antenna is in the split state of the active antenna, the processor is configured to detect whether the average traffic volume of the cell in the current state is less than the second threshold, and when the average traffic volume of the cell in the current state is less than the preset second threshold, maintain enabling of the capacity coverage that is in the second standard and provided for the user, and switch the active antenna of the base station to the beam projection state; and when the user average traffic volume of the cell in the current state exceeds the preset second threshold, maintain enabling of the capacity coverage that is in the second standard and provided for the user, and maintain the active antenna of the base station in the current split state of the active antenna;

where a traffic volume corresponding to the second threshold is greater than a traffic volume corresponding to the first threshold, and the traffic volume corresponding to the second threshold is less than a traffic volume corresponding to the third threshold.

In a fifth possible implementation manner, with reference to the third aspect or any one of the possible implementation manners of the third aspect, in the on state of the active antenna, the processor is further configured to detect a user traffic distribution state in the cell in the current state according to the average traffic volume of the cell in the current state;

when the average traffic volume of the cell in the current state or the user traffic distribution state in the cell changes, update a user traffic distribution map;

adjust the capacity coverage in the second standard according to the updated user traffic map; and set a transmission parameter of the active antenna according to the adjusted capacity coverage in the second standard, where the transmission parameter includes at least one of the following: width, a direction, and power of a beam.

The embodiments of the present invention provide the multimode base station control method and the base station, which can implement real-time control over transmit power of a base station by adjusting a work state of an active antenna of the base station according to a user average traffic volume of a cell, thereby improving network energy efficiency.

BRIEF DESCRIPTION OF THE DRAWINGS

To describe the technical solutions in the embodiments of the present invention or in the prior art more clearly, the following briefly introduces the accompanying drawings required for describing the embodiments or the prior art.

DETAILED DESCRIPTION

The following describes a multimode base station method and a base station in embodiments of the present invention in detail with reference to the accompanying drawings.

The base station provided in the present invention is applicable to a mobile communications system in which multiple standards coexist, where the base station is equipped with a transceiver antenna, and the transceiver antenna includes an active antenna and a passive antenna, where the passive antenna provides a user with service coverage, to receive and send service data in a standard, and the active antenna provides the user with capacity coverage, to receive and send service data in another standard, where the base station may connect to a core network by using an access network, to form the entire mobile communications system.

Figure 1:
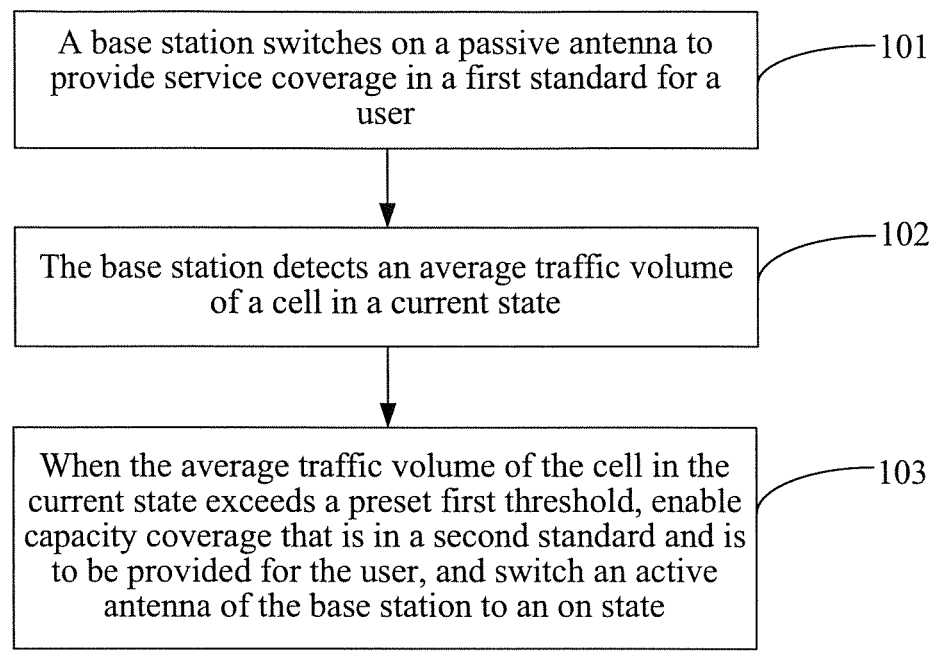
FIG. 1 is a schematic flowchart of a multimode base station control method according to an embodiment of the present invention.

Referring to FIG. 1, a base station control method provided in an embodiment of the present invention includes the following steps:

101: A base station switches on a passive antenna to provide service coverage in a first standard for a user.

102: The base station detects an average traffic volume of a cell in a current state.

103: When the average traffic volume of the cell in the current state exceeds a preset first threshold, enable capacity coverage that is in a second standard and is to be provided for the user, and switch an active antenna of the base station to an on state.

Optionally, this embodiment further includes the following step:

104: When the average traffic volume of the cell in the current state is less than the preset first threshold, disable the capacity coverage that is in the second standard and provided for the user, and switch the active antenna of the base station to an off state.

According to the multimode base station control method provided in this embodiment of the present invention, real-time control over transmit power of a base station can be implemented by adjusting a work state of an active antenna of the base station according to a user average traffic volume of a cell, thereby improving network energy efficiency.

Figure 2:
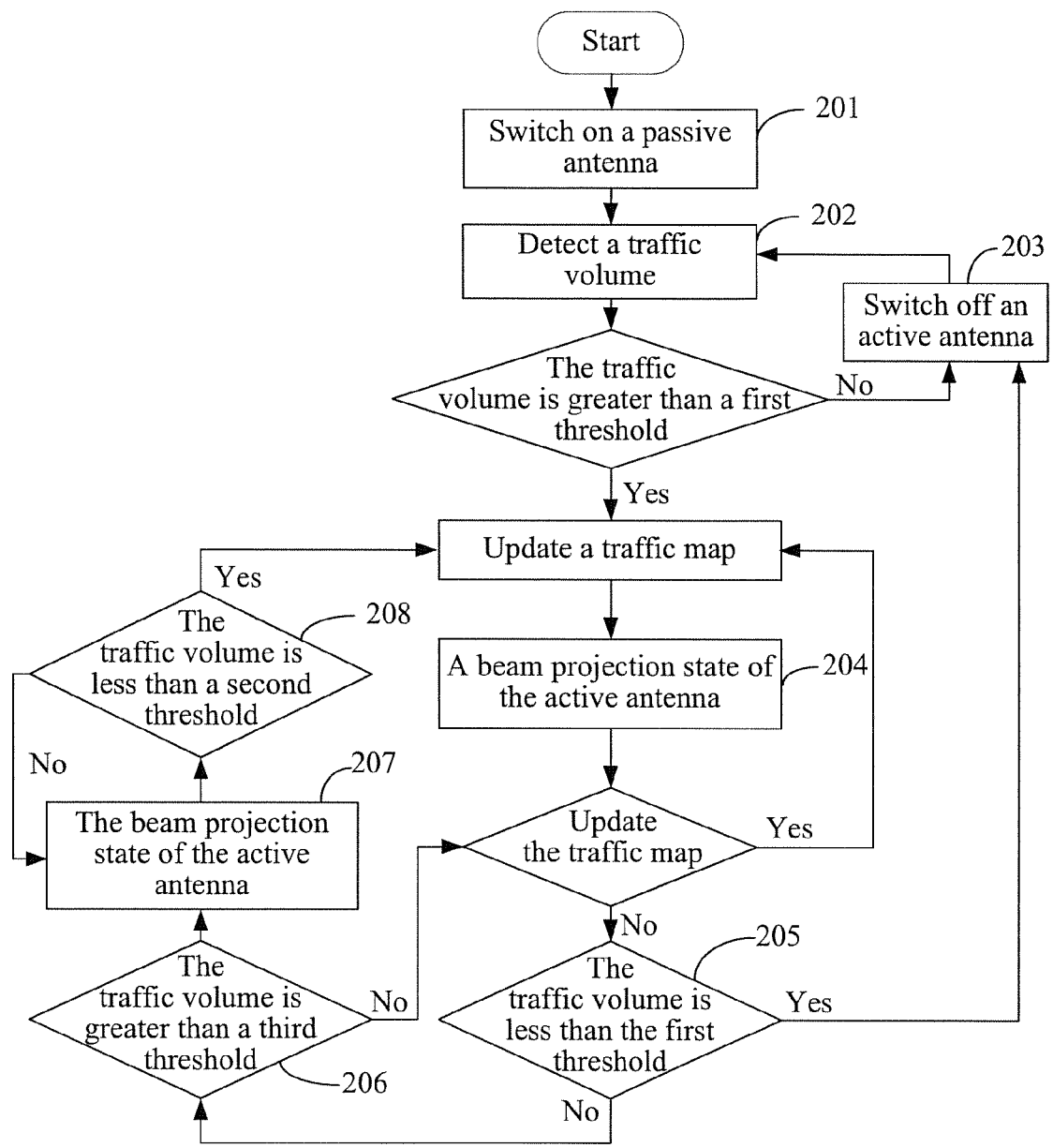
FIG. 2 is a schematic flowchart of a multimode base station control method according to another embodiment of the present invention.

Referring to FIG. 2, another embodiment of the present invention provides a base station control method, including:

201: A base station switches on a passive antenna to provide service coverage in a first standard for a user.

202: The base station detects an average traffic volume of a cell in a current state.

203: When the average traffic volume of the cell in the current state is less than a preset first threshold, disable capacity coverage that is in a second standard and provided for the user, and switch an active antenna of the base station to an off state.

204: When the average traffic volume of the cell in the current state exceeds the preset first threshold, enable the capacity coverage that is in the second standard and is to be provided for the user, and switch the active antenna of the base station to a beam projection state according to the capacity coverage that is in the second standard and provided for the user.

When the active antenna is in the beam projection state,

205: Detect whether the average traffic volume of the cell in the current state is less than the first threshold, and when the user average traffic volume of the cell is less than the first threshold, disable the capacity coverage that is in the second standard and provided for the user, and switch the active antenna of the base station to an off state.

206: When the average traffic volume of the cell is greater than the first threshold, determine whether the average traffic volume of the cell is greater than a third threshold, and when the average traffic volume of the cell is less than the third threshold, maintain enabling of the capacity coverage that is in the second standard and provided for the user, and maintain the active antenna of the base station in the beam projection state.

207: When the user average traffic volume of the cell is greater than the third threshold, maintain enabling of the capacity coverage that is in the second standard and provided for the user, and switch the active antenna of the base station to a split state of the active antenna, where an average traffic volume corresponding to the third threshold exceeds an average traffic volume corresponding to the first threshold.

When the active antenna is in the split state of the active antenna, the method further includes:

208: Detect whether the average traffic volume of the cell in the current state is less than a second threshold, and when the average traffic volume of the cell in the current state is less than the preset second threshold, maintain enabling of the capacity coverage that is in the second standard and provided for the user, and switch the active antenna of the base station to the beam projection state.

209: When the user average traffic volume of the cell in the current state exceeds the preset second threshold, maintain enabling of the capacity coverage that is in the second standard and provided for the user, and maintain the active antenna of the base station in the current split state of the active antenna.

A traffic volume corresponding to the second threshold is greater than a traffic volume corresponding to the first threshold, and the traffic volume corresponding to the second threshold is less than a traffic volume corresponding to the third threshold.

Optionally, referring to FIG. 2, to better control a shape and transmit power of a beam of an active antenna in real time, so as to implement precise control over power of the active antenna, in an on state of the active antenna, the method further includes:

detecting a user traffic distribution state in the cell in the current state according to the average traffic volume of the cell in the current state;

when the average traffic volume of the cell in the current state or the user traffic distribution state in the cell changes, updating a user traffic distribution map;

adjusting the capacity coverage in the second standard according to the updated user traffic map; and setting a transmission parameter of the active antenna according to the adjusted capacity coverage in the second standard, where the transmission parameter includes at least one of the following: width, a direction, and power of a beam.

Optionally, the first standard is UMTS (Universal Mobile Telecommunications System, which means Universal Mobile Telecommunications System), and the second standard is LTE (Long Term Evolution, Long Term Evolution); or the first standard is GSM, and the second standard is LTE; or the first standard is GSM, and the second standard is UMTS; or the first standard is GSM, and the second standard is TD-SCDMA (Time Division-Synchronous Code Division Multiple Access, Time Division-Synchronous Code Division Multiple Access); or the first standard is TD-SCDMA, and the second standard is TD-LTE (Time Division Dual-Long Term Evolution, Long Term Evolution Time-Division Duplex).

According to the multimode base station control method provided in this embodiment of the present invention, real-time control over transmit power of a base station can be implemented by adjusting a work state of an active antenna of the base station according to a user average traffic volume of a cell, thereby improving network energy efficiency.

Figure 3:
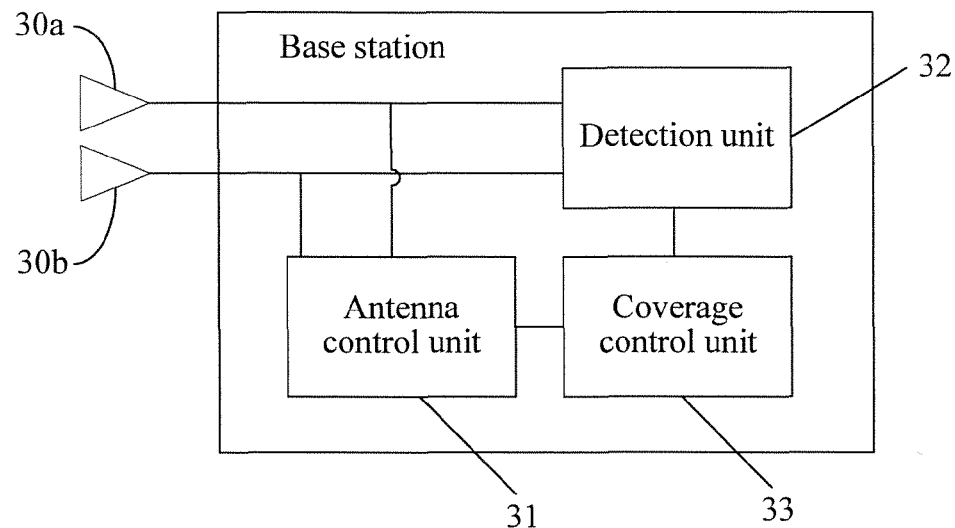
FIG. 3 is a schematic structural diagram of a base station according to an embodiment of the present invention.

Referring to FIG. 3, an embodiment of the present invention provides a base station, including:

an antenna control unit 31, configured to switch on a passive antenna 30*a* to provide service coverage in a first standard for a user;

a detection unit 32, configured to detect an average traffic volume of a cell in a current state; and a coverage control unit 33, configured to: when the detection unit 32 detects that the average traffic volume of the cell in the current state exceeds a preset first threshold, enable capacity coverage that is in a second standard and is to be provided for the user;

where the antenna control unit 31 is further configured to: when the detection unit 32 detects that the average traffic volume of the cell in the current state exceeds the preset first threshold, switch an active antenna 30*b* of the base station to an on state.

Optionally, the coverage control unit 33 is further configured to: when the detection unit detects that the average traffic volume of the cell in the current state is less than the preset first threshold, disable the capacity coverage that is in the second standard and provided for the user; and the antenna control unit 31 is further configured to: when the detection unit 32 detects that the average traffic volume of the cell in the current state is less than the preset first threshold, switch the active antenna 30*b* of the base station to an off state.

According to the base station provided in this embodiment of the present invention, real-time control over transmit power of a base station can be implemented by adjusting a work state of an active antenna of the base station according to a user average traffic volume of a cell, thereby improving network energy efficiency.

Further, the antenna control unit 31 is specifically configured to: when the detection unit 32 detects that the average traffic volume of the cell in the current state exceeds the preset first threshold, switch the active antenna 30*b* of the base station to a beam projection state.

When the active antenna 30*b* is in the beam projection state, the detection unit 32 is further configured to detect whether the average traffic volume of the cell in the current state is less than the first threshold;

the coverage control unit 33 is further configured to: when the detection unit 32 detects that the user average traffic volume of the cell is less than the first threshold, disable the capacity coverage that is in the second standard and provided for the user;

the antenna control unit 31 is further configured to: when the detection unit 32 detects that the user average traffic volume of the cell is less than the first threshold, switch the active antenna 30*b* of the base station to an off state;

the detection unit 32 is further configured to: when the average traffic volume of the cell is greater than the first threshold, determine whether the average traffic volume of the cell is greater than a third threshold;

the coverage control unit 33 is further configured to: when the detection unit 32 detects that the average traffic volume of the cell is less than the third threshold, maintain enabling of the capacity coverage that is in the second standard and provided for the user;

the antenna control unit 31 is further configured to: when the detection unit 32 detects that the average traffic volume of the cell is less than the third threshold, maintain the active antenna 30*b* of the base station in the beam projection state;

the coverage control unit 33 is further configured to: when the detection unit 32 detects that the user average traffic volume of the cell is greater than the third threshold, maintain enabling of the capacity coverage that is in the second standard and provided for the user; and the antenna control unit 31 is further configured to: when the detection unit 32 detects that the user average traffic volume of the cell is greater than the third threshold, switch the active antenna 30*b* of the base station to a split state of the active antenna, where an average traffic volume corresponding to the third threshold exceeds an average traffic volume corresponding to the first threshold.

When the active antenna 30*b* is in the split state of the active antenna, the detection unit 32 is further configured to detect whether the average traffic volume of the cell in the current state is less than a second threshold;

the coverage control unit 33 is further configured to: when the detection unit 32 detects that the average traffic volume of the cell in the current state is less than the preset second threshold, maintain enabling of the capacity coverage that is in the second standard and provided for the user;

the antenna control unit 31 is further configured to: when the detection unit 32 detects that the average traffic volume of the cell in the current state is less than the preset second threshold, switch the active antenna 30*b* of the base station to the beam projection state;

the coverage control unit 33 is further configured to: when the detection unit 32 detects that the user average traffic volume of the cell in the current state exceeds the preset second threshold, maintain enabling of the capacity coverage that is in the second standard and provided for the user; and the antenna control unit 31 is further configured to: when the detection unit 32 detects that the user average traffic volume of the cell in the current state exceeds the preset second threshold, maintain the active antenna 30*b* of the base station in the current split state of the active antenna;

where a traffic volume corresponding to the second threshold is greater than a traffic volume corresponding to the first threshold, and the traffic volume corresponding to the second threshold is less than a traffic volume corresponding to the third threshold.

Figure 4:
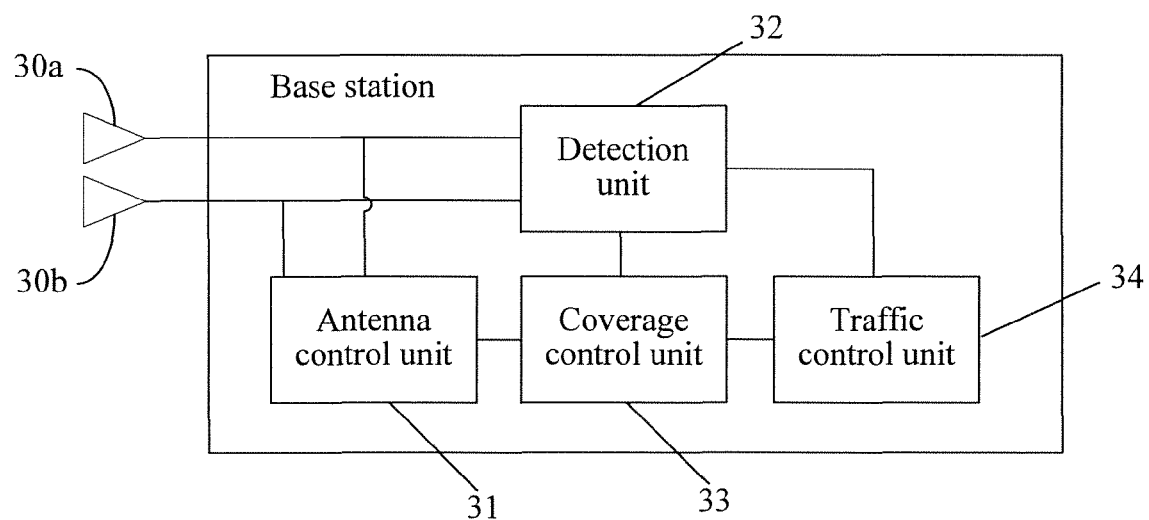
FIG. 4 is a schematic structural diagram of a base station according to another embodiment of the present invention.

Further, referring to FIG. 4, in the on state of the active antenna, the base station further includes: a traffic control unit 34, where:

the detection unit 32 is further configured to detect a user traffic distribution state in the cell in the current state according to the average traffic volume of the cell in the current state;

the traffic control unit 34 is configured to: when the detection unit 32 detects that the average traffic volume of the cell in the current state or the user traffic distribution state in the cell changes, update a user traffic distribution map;

the coverage control unit 33 is configured to adjust the capacity coverage in the second standard according to the user traffic map updated by the traffic control unit 34; and the antenna control unit 31 is configured to set a transmission parameter of the active antenna 30b according to the capacity coverage that is in the second standard and adjusted by the coverage control unit 33, where the transmission parameter includes at least one of the following: width, a direction, and power of a beam.

According to the base station provided in this embodiment of the present invention, real-time control over transmit power of a base station can be implemented by adjusting a work state of an active antenna of the base station according to a user average traffic volume of a cell, thereby improving network energy efficiency.

Figure 5:
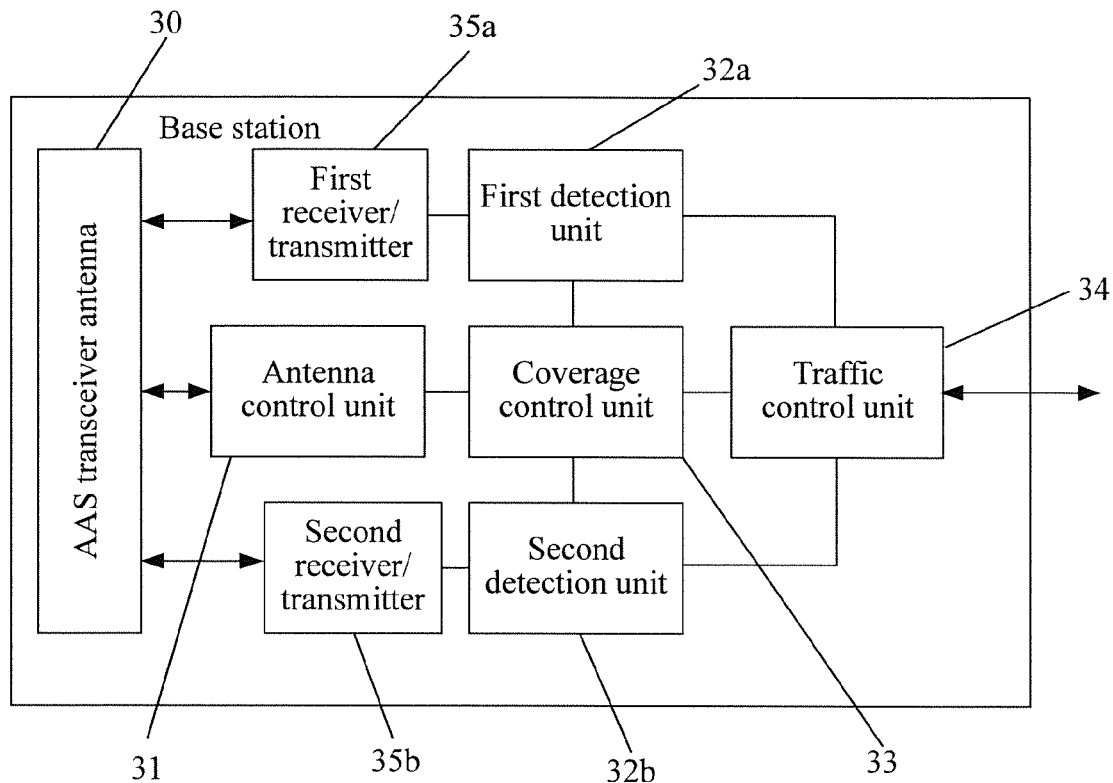
FIG. 5 is a schematic structural diagram of a base station according to still another embodiment of the present invention.

Specifically, referring to FIG. 5, a base station provided in the present invention further includes a receiver/transmitter. In a multimode base station, a signal is received or sent for a service in each standard by using a corresponding receiver/transmitter, and a detection unit detects an average traffic volume of a cell in a current state by using the signal provided by the receiver/transmitter, or certainly may perform detection in another way, for example, perform detection in another link of receiving or sending a signal. Certainly, a description is provided herein by using only an example in which detection is performed on the receiver/transmitter.

The base station in the present invention includes an active antenna system (Active Antenna System, AAS) transceiver antenna, where the AAS transceiver antenna mainly includes a passive antenna and an active antenna over different frequency bands. Multiple frequency bands are integrated to be capable of meeting needs, for frequency bands, of multiple standards and different countries in the system. The passive antenna of the AAS transceiver antenna provides a basic standard (2G or 3G) and service coverage for a service area, and the active antenna provides capacity coverage in an evolved standard (3G or 4G), and can adjust service capacity and a coverage area in real time according to a change status of a user traffic volume in a service area. The receiver/transmitter is connected to the AAS transceiver antenna, and is configured to receive and send a radio frequency signal that carries information, where a first receiver/transmitter 35a receives or sends a signal in a first standard, that is, UMTS, a first receiver/transmitter 35b receives or sends a signal in a second standard, that is, LTE. Certainly, corresponding to the foregoing two receivers/transmitters, two detection units are also used in this embodiment, that is, a first detection unit 32a detects the signal in the first standard, that is, UMTS that is received or sent by the first receiver/transmitter 35a, and a second detection unit 32b detects the signal in the second standard, that is, LTE received or sent by the second receiver/transmitter 35b. The following simply describes functions of composition structures of the base station in this embodiment; and certainly these functions are determined by functions of the base station and the units or modules of the base station that are provided in the foregoing method and device embodiments, and correspond to the functions of the base station and the units or modules of the base station that are provided in the foregoing method and device embodiments. Specifically:

an AAS transceiver antenna 30 includes a passive antenna and an active antenna over different frequency bands, and is configured to receive and send a radio frequency signal that carries information;

an antenna control unit 31 is configured to control the AAS active antenna to be switched on or off, and a transmission parameter of the antenna, where the transmission parameter includes: width, a direction, and power of a beam;

the first receiver/transmitter 35a is configured to perform baseband processing, intermediate radio frequency processing, and power amplification on received and sent UMTS signals;

the second receiver/transmitter 35a is configured to perform baseband processing, intermediate radio frequency processing, and power amplification on received and sent UMTS signals;

the first detection unit 32a is configured to detect a traffic volume of a primary coverage cell, detect UMTS service load, and control user access;

the second detection unit 32b is configured to detect a traffic volume of a capacity coverage cell, detect LTE service load, and control user access;

a traffic control unit 34 is configured to count traffic volumes of UMTS and LTE cells, form a traffic map of an AAS coverage cell, and update the traffic map according to a change status of the traffic volumes; and a coverage control unit 33 is configured to determine whether the AAS active antenna switches a working mode according to a change status of a traffic volume of a cell or traffic map information, select a coverage area of the AAS active antenna, and send a control instruction to the antenna control unit 31.

The base station exchanges control information with a gateway through an interface, so as to exchange, with a network, information about synchronization between sites, an access request and response, traffic volume counting and reporting, baseband signal transmission control, cell traffic distribution, and the like.

The foregoing is only an embodiment provided in the present invention. Certainly, in this embodiment, it may also be that the first standard is set to GSM, and the second standard is set to LTE; or the first standard is set to GSM, and the second standard is set to UMTS; or the first standard is set to GSM, and the second standard is set to TD-SCDMA; or the first standard is set to TD-SCDMA, and the second standard is set to TD-LTE. In this case, only a function of a corresponding functional unit or module needs to be adjusted according to a corresponding standard. A specific implementation method is not described again.

According to the foregoing base station and base station control method, a service capacity and a coverage area can be adjusted in real time according to a change of a user traffic volume in different time segments and areas. For example, in a case of a low traffic volume, a redundant capacity cell is inactivated; in a case of a medium traffic volume, precise coverage over a capacity cell is provided; and in a case of a high traffic volume, maximum coverage over a capacity cell is provided.

Figure 6:
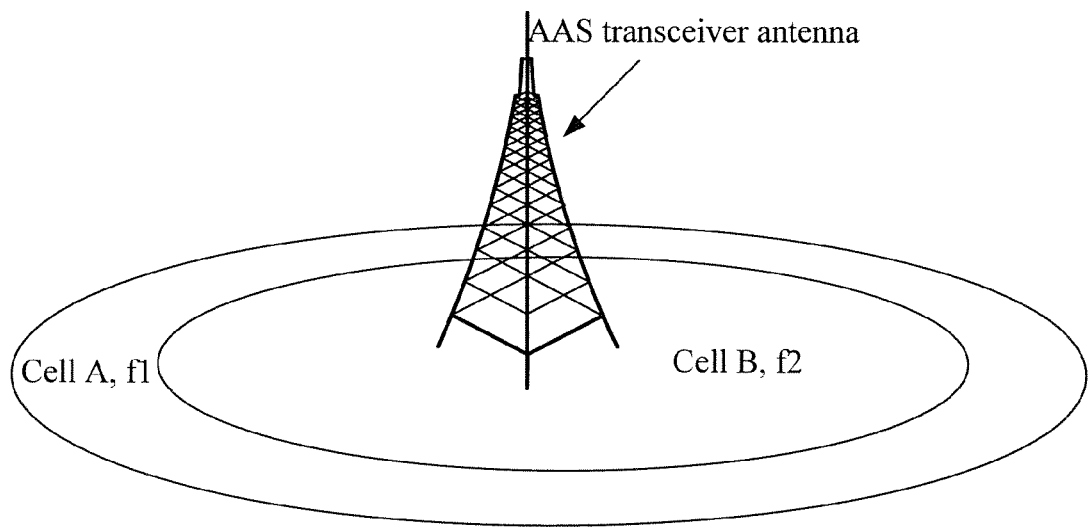
FIG. 6 is a schematic diagram of a working mode of a base station according to an embodiment of the present invention.

FIG. 6 provides a schematic diagram of a working mode of a base station, and shows a cell coverage area of an AAS transceiver antenna of the base station when a traffic volume is low.

When a user traffic volume in a service area of the base station is in a low state (for example, a time segment from night to early morning), a quantity of active users and a data throughput are rather small in the service area. In this case, only a cell for providing a basic standard and service coverage (such as a Cell A) needs to be activated to meet a service need of the service area; and a cell (such as a Cell B) that provides a capacity may be inactivated or sleep, thereby achieving an objective of saving electricity used by the base station.

Figure 7:
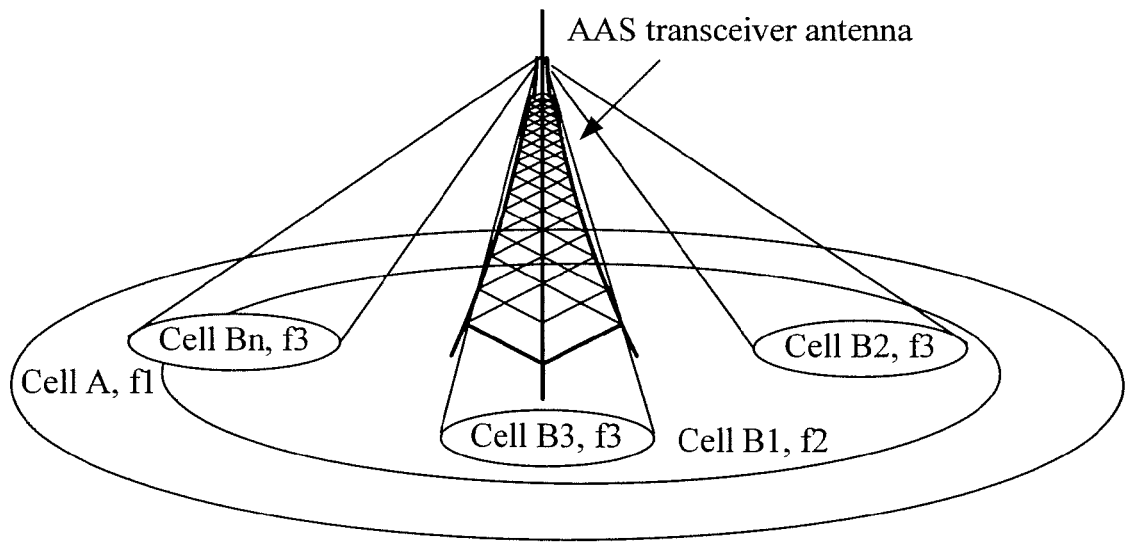
FIG. 7 is a schematic diagram of a working mode of a base station according to another embodiment of the present invention.

FIG. 7 provides a schematic diagram of another working mode of a base station, and shows a cell coverage area of an AAS transceiver antenna of the base station when a traffic volume is medium.

When a user traffic volume in a service area of the base station is in a medium state (for example, a routine work time segment in daytime), an average quantity of active users and an average data throughput are modest in the service area, and a traffic volume in a local area is slightly higher than an average value. In this case, a cell for providing a basic standard and service coverage (such as a Cell A) is activated, and a cell (such as a Cell B) that provides a capacity also needs to be activated, to satisfy a service need of a user. According to a difference between concentration degrees of user distribution in various cells, in some capacity cells (in which users are evenly distributed, for example, a Cell B1, f2), full coverage may be provided for service areas, that is, a capacity of a primary coverage cell is increased. However, in other cells (in which users are concentrated, for example, a Cell B2, f3; a Cell B3, f3; and a Cell Bn, f3), on the basis of identifying an area in which users are concentrated, precise coverage is provided for hotspot areas in the primary coverage cells by using a property of implementing precise projection by means of beamforming of an active antenna, so as to meet a need of an increasing capacity of the hotspot areas. Therefore, in a case in which a capacity exceeds a capacity of a primary coverage cell, by enabling a capacity cell, a network capacity elastically changes as a service grows, and energy is precisely distributed according to a service distribution area of the user, thereby preventing invalid scatter of transmit power, and achieving an objective of reducing power consumption of the base station.

Figure 8:
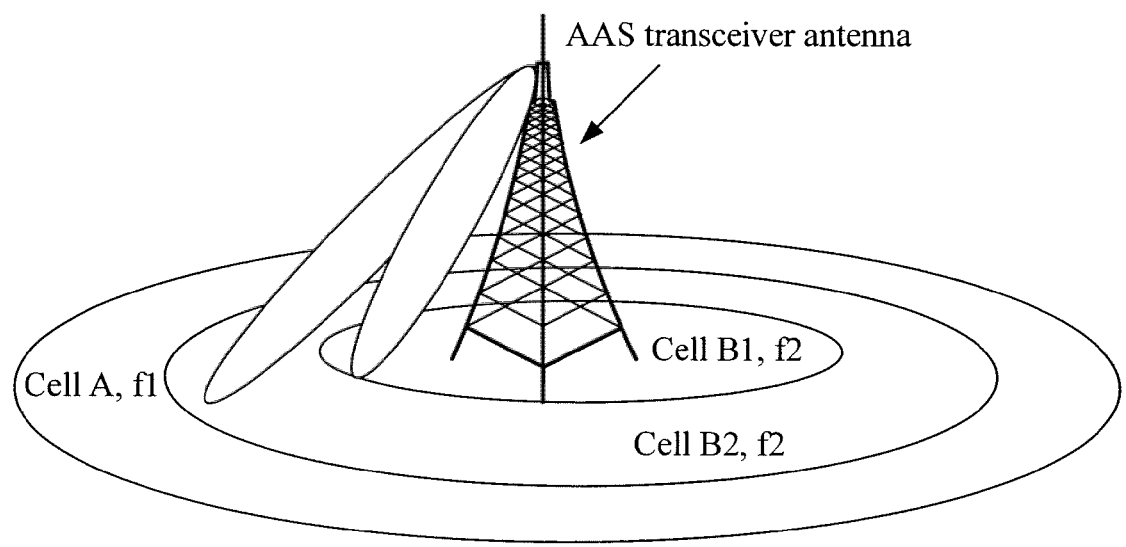
FIG. 8 is a schematic diagram of a working mode of a base station according to still another embodiment of the present invention.

FIG. 8 provides a schematic diagram of still another working mode of a base station, and shows a cell coverage area of an AAS transceiver antenna of the base station when a traffic volume is high.

When a user traffic volume in a service area of the base station is in a peak state (for example, a business time segment of a major commercial center in an urban area), an average quantity of active users and an average data throughput are rather large in the service area. In this case, a cell for providing a basic standard and service coverage (such as a Cell A) and a capacity cell (such as a Cell B) are activated, and to satisfy a need generated as a user traffic volume rapidly increases in some time segments and in a period, cell split (which is in a horizontal or vertical manner, as shown in the figure, the capacity cell is split into a Cell B1, f2 and a Cell B2, f2) further needs to be implemented by controlling beamforming of an active antenna, so as to further increase a throughput provided by the capacity cell, and provide, for a user of the cell, a maximum service capacity that satisfies a service need.

Therefore, it can been known from the foregoing three work states that a base station based on an AAS can adjust an antenna coverage beam in real time according to a change of a traffic volume of a coverage area, which not only can achieve that power consumption of the base station accords with a traffic volume need of a cell served by the base station, but also can prevent a waste of transmit power of the base station, and achieve an objective of reducing the power consumption of the base station, thereby improving network energy efficiency.

Figure 9:
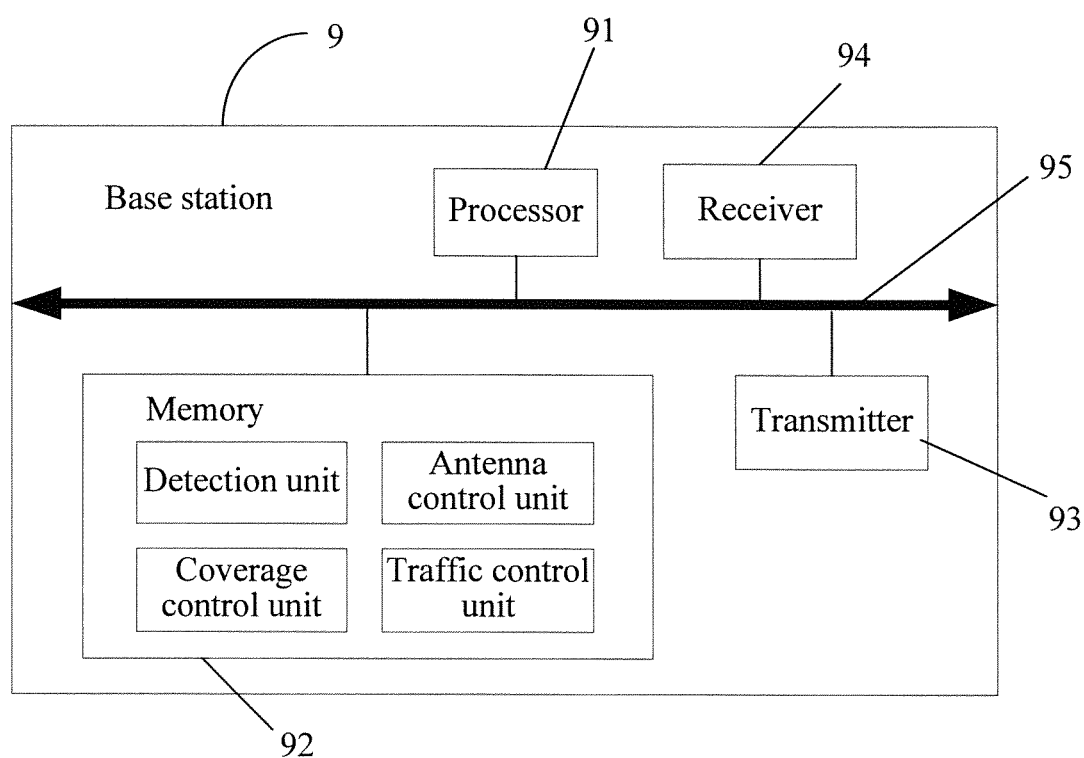
FIG. 9 is a schematic structural diagram of a base station according to another embodiment of the present invention.

Referring to FIG. 9, an embodiment of the present invention further provides a base station, configured to implement a multimode base station control method provided in an embodiment of the present invention. Specifically, referring to FIG. 9, the base station includes: at least one processor 91, memory 92, receiver 93, transmitter 94, and data bus 95, where the data bus 95 is configured to implement connection and communication between the processor 91, the memory 92, the receiver 93, and the transmitter 94, and the memory 92 is configured to store program code and data that are executed by the processor 91.

The data bus 95 may be an industry standard architecture (Industry Standard Architecture, ISA for short) bus, a peripheral component interconnect (Peripheral Component, PCI for short) bus, an extended industry standard architecture (Extended Industry Standard Architecture, EISA for short) bus, or the like. The data bus 85 may be classified into an address bus, a data bus, a control bus, and the like, and is represented by only one thick line in FIG. 9 for ease of representation, which however does not indicate that there is only one bus or one type of bus.

The memory 92 is configured to store data or executable program code, where the program code includes a computer operation instruction, which may be specifically: an operating system, an application program, or the like. The memory 92 may include a high-speed RAM memory, and may further include a non-volatile memory (non-volatile memory), for example, at least one magnetic disk memory.

The processor 91 may be a central processing unit (Central Processing Unit, CPU for short), or an application specific integrated circuit (Application Specific Integrated Circuit, ASIC for short), or one or more integrated circuits configured to implement this embodiment of the present invention.

The processor 91 is configured to implement functions of the detection unit, the antenna control unit, the coverage control unit, and the traffic control unit in the foregoing embodiments by executing the program code in the memory 92, and implement the following functions.

The processor 91 is configured to switch on a passive antenna to provide service coverage in a first standard for a user; detect an average traffic volume of a cell in a current state; and when the average traffic volume of the cell in the current state exceeds a preset first threshold, enable capacity coverage that is in a second standard and is to be provided for the user, and switch an active antenna of the base station to an on state.

Optionally, the processor 91 is further configured to: when the average traffic volume of the cell in the current state is less than the preset first threshold, disable the capacity coverage that is in the second standard and provided for the user, and switch the active antenna of the base station to an off state.

Further, the processor 91 is specifically configured to: when the average traffic volume of the cell in the current state exceeds the preset first threshold, enable the capacity coverage that is in the second standard and is to be provided for the user, and switch the active antenna of the base station to a beam projection state.

When the active antenna is in the beam projection state, the processor 91 is configured to detect whether the average traffic volume of the cell in the current state is less than the first threshold, and when the user average traffic volume of the cell is less than the first threshold, disable the capacity coverage that is in the second standard and provided for the user, and switch the active antenna of the base station to an off state; when the average traffic volume of the cell is greater than the first threshold, determine whether the average traffic volume of the cell is greater than a third threshold, and when the average traffic volume of the cell is less than the third threshold, maintain enabling of the capacity coverage that is in the second standard and provided for the user, and maintain the active antenna of the base station in the beam projection state; and when the user average traffic volume of the cell is greater than the third threshold, maintain enabling of the capacity coverage that is in the second standard and provided for the user, and switch the active antenna of the base station to a split state of the active antenna, where an average traffic volume corresponding to the third threshold exceeds an average traffic volume corresponding to the first threshold.

When the active antenna is in the split state of the active antenna, the processor 91 is configured to detect whether the average traffic volume of the cell in the current state is less than the second threshold, and when the average traffic volume of the cell in the current state is less than the preset second threshold, maintain enabling of the capacity coverage that is in the second standard and provided for the user, and switch the active antenna of the base station to the beam projection state; and when the user average traffic volume of the cell in the current state exceeds the preset second threshold, maintain enabling of the capacity coverage that is in the second standard and provided for the user, and maintain the active antenna of the base station in the current split state of the active antenna, where a traffic volume corresponding to the second threshold is greater than a traffic volume corresponding to the first threshold, and the traffic volume corresponding to the second threshold is less than a traffic volume corresponding to the third threshold.

In the on state of the active antenna, the processor 91 is further configured to detect a user traffic distribution state in the cell in the current state according to the average traffic volume of the cell in the current state; and when the average traffic volume of the cell in the current state or the user traffic distribution state in the cell changes, update a user traffic distribution map; and adjust the capacity coverage in the second standard according to the updated user traffic map; and set a transmission parameter of the active antenna according to the adjusted capacity coverage in the second standard, where the transmission parameter includes at least one of the following: width, a direction, and power of a beam.

According to the base station provided in this embodiment of the present invention, real-time control over transmit power of a base station can be implemented by adjusting a work state of an active antenna of the base station according to a user average traffic volume of a cell, thereby improving network energy efficiency.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A multimode base station control method, comprising:
   switching on, by a base station, a passive antenna to provide service coverage in a first standard for a user;
   detecting, by the base station, an average traffic volume of a cell in a current state; and
   when the average traffic volume of the cell in the current state exceeds a preset first threshold:
      enabling capacity coverage that is in a second standard and is to be provided for the user, and switching an active antenna of the base station to an on state;
   wherein enabling the capacity coverage that is in the second standard and is to be provided for the user, and switching the active antenna of the base station to the on state comprises:
      switching the active antenna of the base station to a beam projection state;
   wherein when the active antenna is in the beam projection state, the method further comprises:
      detecting whether the average traffic volume of the cell in the current state is less than the first threshold;
      when the average traffic volume of the cell is less than the first threshold, disabling the capacity coverage that is in the second standard and provided for the user, and switching the active antenna of the base station to an off state;

when the average traffic volume of the cell is greater than the first threshold, determining whether the average traffic volume of the cell is greater than a third threshold, and when the average traffic volume of the cell is less than the third threshold, maintaining enabling of the capacity coverage that is in the second standard and provided for the user, and maintaining the active antenna of the base station in the beam projection state; and when the average traffic volume of the cell is greater than the third threshold, maintaining enabling of the capacity coverage that is in the second standard and provided for the user, and switching the active antenna of the base station to a split state of the active antenna, wherein an average traffic volume corresponding to the third threshold exceeds an average traffic volume corresponding to the first threshold.

2. The method according to claim 1, wherein the method further comprises:

when the average traffic volume of the cell in the current state is less than the preset first threshold, disabling the capacity coverage that is in the second standard and provided for the user, and switching the active antenna of the base station to an off state.

3. The method according to claim 1, wherein when the active antenna is in the split state of the active antenna, the method further comprises:

detecting whether the average traffic volume of the cell in the current state is less than a second threshold, and when the average traffic volume of the cell in the current state is less than the preset second threshold, maintaining enabling of the capacity coverage that is in the second standard and provided for the user, and switching the active antenna of the base station to the beam projection state; and when the average traffic volume of the cell in the current state exceeds the preset second threshold, maintaining enabling of the capacity coverage that is in the second standard and provided for the user, and maintaining the active antenna of the base station in the current split state of the active antenna;

wherein a traffic volume corresponding to the second threshold is greater than a traffic volume corresponding to the first threshold, and the traffic volume corresponding to the second threshold is less than a traffic volume corresponding to the third threshold.

4. The method according to claim 3, wherein in the on state of the active antenna, the method further comprises:

detecting a user traffic distribution state in the cell in the current state according to the average traffic volume of the cell in the current state;

when the average traffic volume of the cell in the current state or the user traffic distribution state in the cell changes, updating a user traffic distribution map;

adjusting the capacity coverage in the second standard according to the updated user traffic map; and setting a transmission parameter of the active antenna according to the adjusted capacity coverage in the second standard, wherein the transmission parameter comprises at least one of the following: width, a direction, and power of a beam.

5. The method according to claim 1, wherein:

the first standard is Universal Mobile Telecommunications System (UMTS), and the second standard is Long Term Evolution (LTE); or the first standard is Global System for Mobile communications (GSM), and the second standard is LTE; or the first standard is GSM, and the second standard is UMTS; or the first standard is GSM, and the second standard is Time Division-Synchronous Code Division Multiple Access (TD-SCDMA); or the first standard is TD-SCDMA, and the second standard is Long Term Evolution Time-Division Duplex (TD-LTE).

6. A base station, comprising:

at least one processor:

a memory;

a receiver;

a transmitter; and a data bus;

wherein the data bus implements connection and communication between the processor, the memory, the receiver, and the transmitter;

the memory stores program code and data that are executed by the processor;

the receiver receives service data by using an antenna; and the transmitter transmits service data by using the antenna;

wherein the processor switches on a passive antenna to provide service coverage in a first standard for a user, detects an average traffic volume of a cell in a current state, and when the average traffic volume of the cell in the current state exceeds a preset first threshold, enables capacity coverage that is in a second standard and is to be provided for the user, and switches an active antenna of the base station to an on a beam projection state;

wherein when the active antenna is in the beam projection state, the processor detects whether the average traffic volume of the cell in the current state is less than the first threshold;

when the average traffic volume of the cell is less than the first threshold, the processor disables the capacity coverage that is in the second standard and provided for the user, and switches the active antenna of the base station to an off state;

when the average traffic volume of the cell is greater than the first threshold, the processor determines whether the average traffic volume of the cell is greater than a third threshold, and when the average traffic volume of the cell is less than the third threshold, maintains enabling of the capacity coverage that is in the second standard and provided for the user, and maintains the active antenna of the base station in the beam projection state; and when the average traffic volume of the cell is greater than the third threshold, the processor maintains enabling of the capacity coverage that is in the second standard and provided for the user, and switches the active antenna of the base station to a split state of the active antenna;

wherein an average traffic volume corresponding to the third threshold exceeds an average traffic volume corresponding to the first threshold.

7. The base station according to claim 6, wherein:

when the average traffic volume of the cell in the current state is less than the preset first threshold, the processor further disables the capacity coverage that is in the second standard and provided for the user; and switches the active antenna of the base station to an off state.

8. The base station according to claim 6, wherein when the active antenna is in the split state of the active antenna, the processor detects whether the average traffic volume of the cell in the current state is less than the second threshold; and when the average traffic volume of the cell in the current state is less than the preset second threshold, maintains enabling of the capacity coverage that is in the second standard and provided for the user; and switches the active antenna of the base station to the beam projection state; and when the average traffic volume of the cell in the current state exceeds the preset second threshold, the processor maintains enabling of the capacity coverage that is in the second standard and provided for the user; and maintains the active antenna of the base station in the current split state of the active antenna;

wherein a traffic volume corresponding to the second threshold is greater than a traffic volume corresponding to the first threshold, and the traffic volume corresponding to the second threshold is less than a traffic volume corresponding to the third threshold.

9. The base station according to claim 6, wherein in the on state of the active antenna, the processor further detects a user traffic distribution state in the cell in the current state according to the average traffic volume of the cell in the current state;

when the average traffic volume of the cell in the current state or the user traffic distribution state in the cell changes, updates a user traffic distribution map;

adjusts the capacity coverage in the second standard according to the updated user traffic map; and sets a transmission parameter of the active antenna according to the adjusted capacity coverage in the second standard, wherein the transmission parameter comprises at least one of the following: width, a direction, and power of a beam.

* * * * *